US009696458B2

(12) United States Patent
Fengler

(10) Patent No.: US 9,696,458 B2
(45) Date of Patent: Jul. 4, 2017

(54) METHOD AND DEVICE FOR DETERMINING PHYSICAL QUANTITIES AT A PLURALITY OF LOCATIONS

(71) Applicant: Martin Johannes Fengler, St. Gallen (CH)

(72) Inventor: Martin Johannes Fengler, St. Gallen (CH)

(73) Assignee: METEOMATICS GMBH, St. Gallen (CH)

( * ) Notice: Subject to any disclaimer, the term of this patent is extended or adjusted under 35 U.S.C. 154(b) by 62 days.

(21) Appl. No.: 14/813,778

(22) Filed: Jul. 30, 2015

(65) Prior Publication Data
US 2016/0033677 A1 Feb. 4, 2016

(30) Foreign Application Priority Data
Jul. 31, 2014 (DE) .................. 10 2014 215 098

(51) Int. Cl.
*G01W 1/08* (2006.01)
*G01K 7/42* (2006.01)
(52) U.S. Cl.
CPC ............... *G01W 1/08* (2013.01); *G01K 7/427* (2013.01)
(58) Field of Classification Search
None
See application file for complete search history.

(56) References Cited

U.S. PATENT DOCUMENTS

| 5,796,471 A * | 8/1998 | Wilkerson ............... G01S 17/95 |
| | | 356/28.5 |
| 9,300,388 B1 * | 3/2016 | Behroozi ........... H04B 7/18504 |
| 2007/0171046 A1 * | 7/2007 | Diem .................... G06Q 10/00 |
| | | 340/539.13 |
| 2012/0050750 A1 * | 3/2012 | Hays ...................... G01J 9/04 |
| | | 356/519 |
| 2012/0169053 A1 * | 7/2012 | Tchoryk, Jr. ............... G01P 5/26 |
| | | 290/44 |

(Continued)

OTHER PUBLICATIONS

German Patent Office, Examiner Report corresponding to German Patent Application No. 10 2014 215 098.1, Jun. 2, 2015.

(Continued)

*Primary Examiner* — Andre Allen
(74) *Attorney, Agent, or Firm* — Squire Patton Boggs (US) LLP

(57) ABSTRACT

According to the present invention, a method and a device for determining a physical quantity at a plurality of locations are provided. The method according to the invention comprises approaching the plurality of locations in a first predetermined direction, wherein at each location of the plurality of locations a first measured value of the physical quantity is measured, approaching the plurality of locations in a second predetermined direction substantially opposite to the first predetermined direction, wherein at each location of the plurality of locations a second measured value of the physical quantity is measured, and establishing a determination value for the physical quantity at a respective location of the plurality of locations based on the first and second measured values of the physical quantity which have been measured at the respective location.

9 Claims, 3 Drawing Sheets

(56) References Cited

U.S. PATENT DOCUMENTS

2013/0314694 A1* 11/2013 Tchoryk, Jr. ............ G01S 17/95
356/28.5
2015/0063159 A1* 3/2015 Bonawitz ........... H04B 7/18504
370/254
2016/0226573 A1* 8/2016 Behroozi ........... H04B 7/18504

OTHER PUBLICATIONS

Gerthsen, Christian et al.: "Einführung in das Physikalische Praktikum für Mediziner and für das Anfängerpraktikum", Springer-Verlag Berlin Heidelberg New York 1971, ISBN 3-540-05510-X.

Jonassen, Marius Opsanger: "The small unmanned meteorological observer (SUMO), Characterization and test of a new measurement system for atmospheric boundary layer research", Master Thesis, Jun. 2008, University of Bergen Geophysical Institute.

* cited by examiner

METHOD AND DEVICE FOR DETERMINING PHYSICAL QUANTITIES AT A PLURALITY OF LOCATIONS

CROSS REFERENCE TO RELATED APPLICATIONS

This application claims foreign priority to German Patent Application No. 102014215098.1 filed Jul. 31, 2014, under 35 U.S.C. §119, the entire contents of which are incorporated herein by reference thereto.

BACKGROUND

For predicting a wide range of weather phenomena, a state in the future is derived from an already past state and the current state of the atmosphere while applying known physical and meteorological rules.

The state of the atmosphere is expressed by different physical quantities, such as temperature and humidity.

Weather balloons are known to be used for the measurement of different physical quantities at different altitudes above the ground.

A weather balloon is a lift-producing balloon which transports meteorological measuring devices. If the weather balloon is started on the ground, it rises and, during the ascent, measures one or several altitude-dependent (location-dependent) physical quantities by means of the meteorological measuring devices.

The measured physical quantities are recorded and/or transmitted to a ground station via a radio interface.

The rising speed of such a weather balloon depends on the respective environmental conditions (altitude, air temperature, air pressure) as well as on the physical properties of the weather balloon (density of the filling gas, ductility of the balloon skin, weight of the weather balloon). The rising direction basically depends on air currents (winds).

When the weather balloon reaches a specific altitude, the balloon bursts, the measurements end, and the measuring devices fall to the ground in a decelerated or non-decelerated manner.

In the course of the described measurement, so-called first-type thermometer errors occur.

For example, a measuring device (e.g. a thermometer) detects an external temperature. As sensors (e.g. measuring devices) usually show a reaction time in order to react to changes in the actually existing physical quantities, the values measured by means of such a weather balloon are smeared when the air mass is flown through. In particular, while the weather balloon, or rather the measuring devices of the weather balloon are already in another (higher) air layer, the temperature of an already passed through (lower) air layer has an effect on the measurement result of the measuring devices in the higher air layer. This measurement delay, which assigns a physical value at a first location to a measurement at a second location, is called "first-type thermometer error".

Hence, the series of measurements made by such a weather balloon for different altitudes (locations) passed through at least contains this first-type thermometer error.

However, measurement data which are as precise as possible are required to allow weather predictions which are as precise as possible.

The invention indicated in claim 1 starts out from the problem of eliminating or lessening first-type thermometer errors so as to enable measurement data that are more exact than those obtainable according to the known prior art.

SUMMARY OF THE INVENTION

This problem is solved by the features indicated in claim 1.

In particular, a method provided according to the invention for determining a physical quantity at a plurality of locations comprises approaching the plurality of locations in a first predetermined direction, wherein at each location of the plurality of locations a first measured value of the physical quantity is measured, approaching the plurality of locations in a second predetermined direction substantially opposite to the first predetermined direction, wherein at each location of the plurality of locations a second measured value of the physical quantity is measured, and establishing a determination value for the physical quantity at a respective location of the plurality of locations, based on the first and second measured values of the physical quantity which have been measured at the respective location. An absolute approaching speed for the first predetermined direction and the second predetermined direction at a respective location of the plurality of locations is substantially equal.

The advantages achieved by the invention particularly consist in that the influence of first-type thermometer errors is eliminated/lessened, enabling more exact measurement data. In particular, according to the inventive method, first-type thermometer errors firstly occur when the measurement is made during the movement in the first direction and when carrying out the measurement during the movement in the second direction opposite to the first direction. As these first-type thermometer errors occur with basically opposite directions, their influences are neutralized completely or at least partially when the measured values measured at a respective location are jointly considered. Even if a used sensor is not afflicted by a first-type thermometer error, a statistically more exact result (a statistically more exact determination value for the physical quantity) can be obtained by considering several measured values of the physical quantity.

If the speed at which a location is passed through in the one direction and the speed at which the location is passed through in the other direction are substantially equal, also the influences of the layer (air layer) respectively passed through before on the sensor are approximately equal, particularly if one assumes a linear course of the physical quantity around the respective location. In this connection, a linear course of the physical quantity around the respective location, i.e. in a local environment, is an always admissible assumption. Therefore, in this way, the influences of the respective first-type thermometer errors can be compensated still more precisely.

An advantageous embodiment of the invention is indicated in claim 2. Accordingly, each location of the plurality of locations is defined by an altitude over a reference point, the first predetermined direction is basically directed upwards and the second predetermined direction is basically directed downwards.

This is advantageous because, particularly in meteorology, the behavior of the physical quantities (e.g. temperature) in the different air layers can be determined exactly, these being basically identified by the altitude thereof. Furthermore, in this way, the first part of the method can e.g. be started on the ground and can be carried out up to a desired altitude while the second part of the method is carried out on the way back to the ground and, particularly, to the starting point.

The method according to the invention is, however, not restricted to meteorological applications and may be started at other places than the ground, as well.

According to a further advantageous embodiment of the invention, the reference point is one of a mean sea level and an approach starting point.

According to a further advantageous embodiment of the invention, the determination value for the physical quantity at a respective location of the plurality of locations is established, based on the first and second measured values of the physical quantity which have been measured at a predetermined number of approached locations around the respective location.

A measurement window spanned by the predetermined number of approached locations around the respective location additionally enables a balancing of statistical measurement inaccuracies and, in this way, more exact measurement end values.

According to a further advantageous embodiment of the invention, said establishing the determination value for the physical quantity at the respective location of the plurality of locations comprises a formation of an average from the first and second measured values of the physical quantity which have been measured at the respective location.

By means of the formation of a mean value, the oppositely directed error components are completely or at least partly neutralized in accordance with their absolute values.

The mean value formation e.g. comprises a formation of a median, a formation of an arithmetic mean, or a formation of a quadratic mean. Also, e.g. weighted mean values can be formed, so that an approach in one of the two directions goes along with a higher weight than an approach in the other direction.

According to a further advantageous embodiment of the invention, the method further comprises adapting an approaching speed based on an extent of change of the physical quantity between adjacent locations, wherein the approaching speed is reduced when the extent of change is increased, and the approaching speed is increased when the extent of change is reduced.

This means that the absolute speed need not be constant. If it is, on the other hand, adapted such that ranges having a larger gradient (i.e. a greater change) with respect to the physical quantity are passed through more slowly than ranges having a smaller gradient, precise courses of measurement can be recorded also in the ranges of the greater change of the physical quantity to be measured.

According to a further advantageous embodiment of the invention, the physical quantity is one of temperature, humidity, wind velocity, wind direction, radioactivity, particle density, dew point, ozone concentration or nitrogen oxide concentration.

Preferably, a selection or all of the physical quantities can be measured at the same time. Furthermore, the present invention is not restricted to the said quantities, but is applicable to all physical quantities which change between different locations.

According to a further advantageous embodiment of the invention, each location of the plurality of locations is defined by global coordinates.

Besides conventional methods such as an altitude determination by means of an ambient pressure or a distance sensor directed towards the ground, this enables an orientation by means of a global navigation system, e.g. GPS.

The problem is also solved by means of the features listed in claim 9.

In particular, a device provided according to the invention for determining a physical quantity at a plurality of locations comprises a measuring device, a movement device and a control device, wherein the movement device and the control device are configured to approach the plurality of locations in a first predetermined direction, wherein the measuring device is configured to measure a first measured value of the physical quantity at each location of the plurality of locations, wherein the movement device and the control device are further configured to approach the plurality of locations in a second predetermined direction substantially opposite to the first predetermined direction, wherein the measuring device is further configured to measure a second measured value of the physical quantity at each location of the plurality of locations, and wherein the control device is further configured to establish a determination value for the physical quantity at a respective location of the plurality of locations based on the first and second measured values of the physical quantity which have been measured at the respective location, and wherein an absolute approaching speed for the first predetermined direction and the second predetermined direction at a respective location of the plurality of locations is substantially equal.

BRIEF DESCRIPTION OF THE DRAWINGS

By means of the attached drawing, an embodiment of the invention will be described in greater detail. In the drawing.

DETAILED DESCRIPTION OF THE EMBODIMENTS

Figure 1:
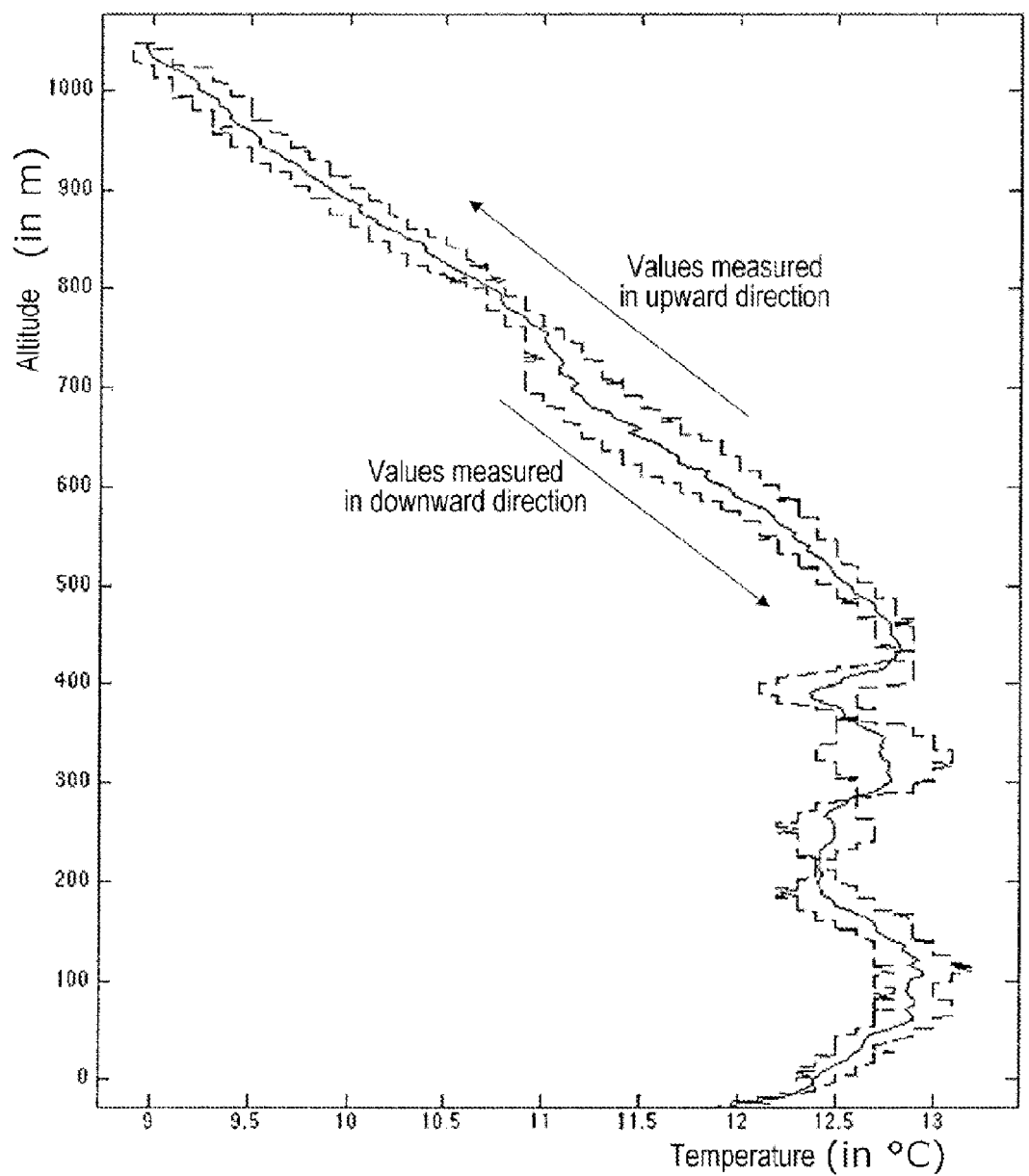
FIG. 1 shows a diagram illustrating an exemplary course of measured values according to the present invention.

FIG. 1 particularly shows a diagram in which a temperature (in ° C.) has been entered as a physical quantity on an abscissa axis, and an altitude (in m) has been entered as a location on an axis of ordinates.

Basically, three curves have been drawn in the diagram.

The right (step-shaped) curve of the three curves shows the values measured for the temperature in dependence on the altitude when approaching the plurality of locations from the bottom to the top, i.e. with the altitude increasing (values measured in the upward direction). The stepped shape of the curve results from the temperature measuring device of this exemplary embodiment having a discrete resolution. In particular, the measuring device here shows a discrete resolution of 0.1° C.

The left (step-shaped) curve of the three curves shows the values measured for the temperature in dependence on the altitude when approaching the plurality of locations from the top to the bottom, i.e. with the altitude decreasing (values measured in the downward direction). Also the stepped shape of this curve results from the temperature measuring device of this exemplary embodiment having a discrete resolution. In particular, the measuring device here shows a discrete resolution of 0.1° C.

When comparing the two step-shaped curves, it is obvious that, in the measurement in the upward direction, the temperature of the lower (already flown through) air layer (basically higher temperature) has some influence on the measurement result at a specific altitude (first-type thermometer error), whereas in the measurement in the downward direction the temperature of the higher (already flown through) air layer (basically lower temperature) has some influence on the measurement result at a specific altitude (first-type thermometer error), so that the respective curve shows overall higher (measurement in the upward direction) or lower (measurement in the downward direction) temperature values than the respective other curve.

The curve in the middle of the three curves shows the course of the determination values for the temperature in dependence on the altitude resulting from a mean value formation from the two step-shaped measurement curves.

According to a preferred embodiment of the present invention, an aircraft is equipped with a measuring instrument (measuring device).

The aircraft is configured particularly for vertical flying maneuvers, i.e. basically for vertical climb flights and vertical descents with the speed being controllable in each case, and basically without lateral movement.

Figure 2:
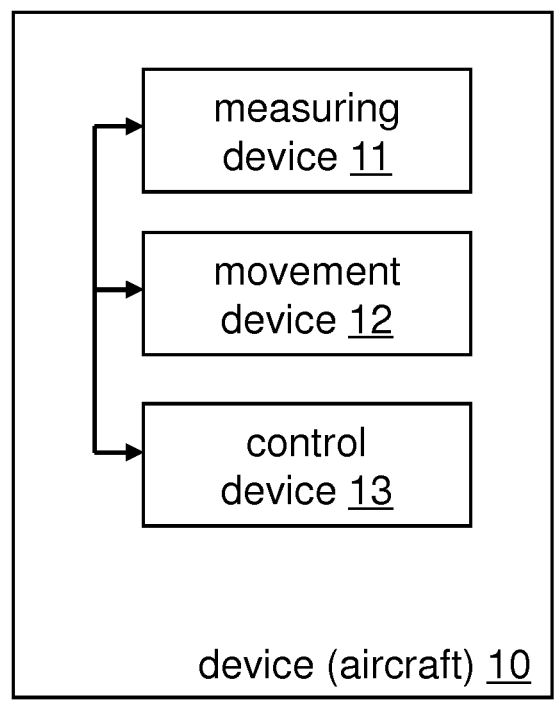
FIG. 2 is a block diagram illustrating an apparatus according to exemplary embodiments of the present invention.

FIG. 2 illustrates an exemplary device 10 according to the features of claim 9.

Preferably, the aircraft (drone) can be a multicopter, i.e. an aircraft that has several propellers or rotors acting downwardly in order to generate climb and, by inclination of the rotor plane, also propulsion (movement device 12).

The measuring instrument is e.g. a measuring device 11 for measuring temperature, humidity, wind velocity, wind direction, radioactivity, particle density (e.g. respirable dust pollution) or another physical quantity, and is capable of detecting a measured value for the physical quantity at a specific altitude.

The aircraft itself and the measuring device 11 can be controlled by one or more control devices (control apparatus 13).

According to this embodiment, the aircraft (device 10) according to the invention applies the method according to the invention for determining a physical quantity at a plurality of locations.

Figure 3:
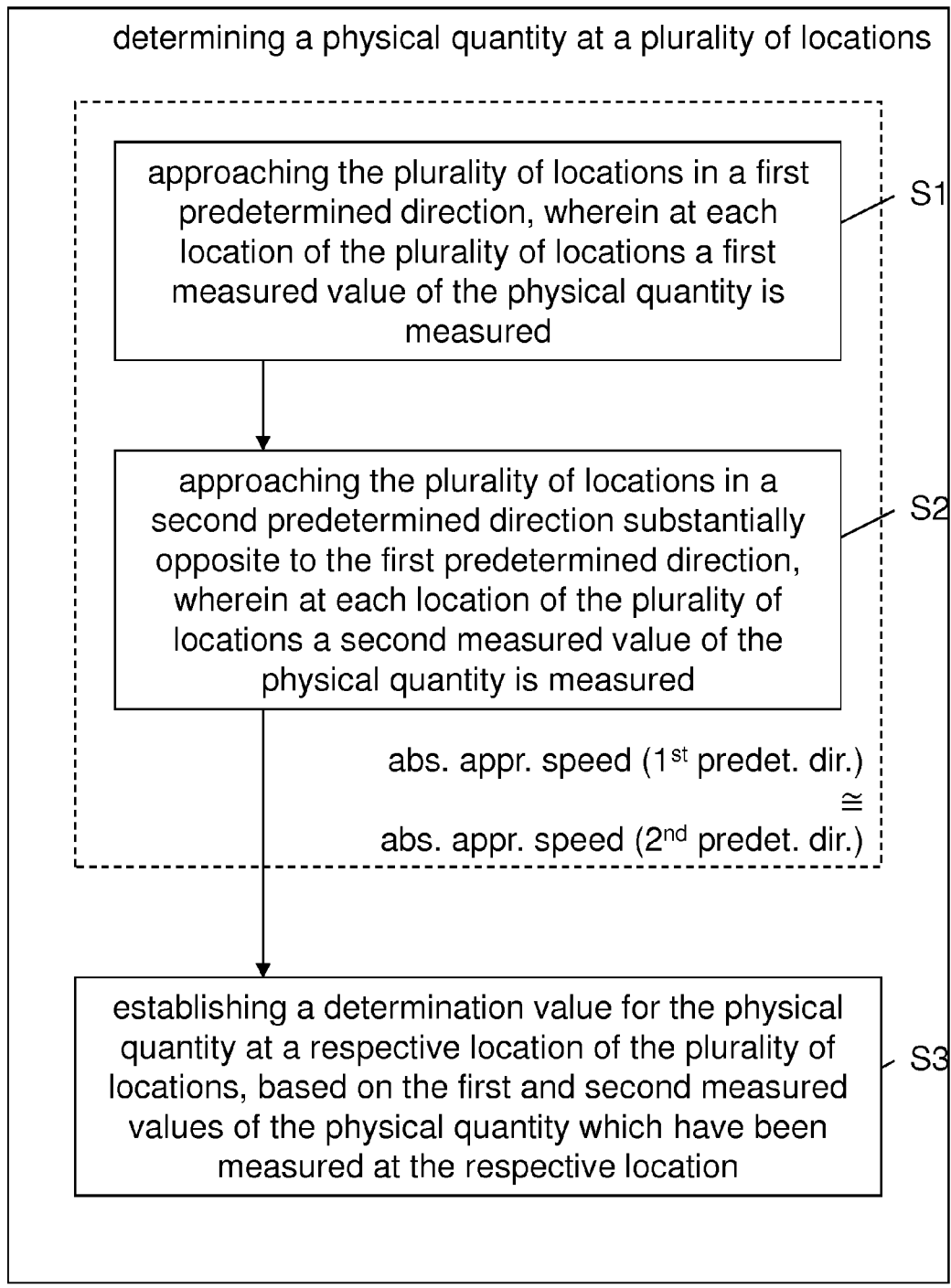
FIG. 3 is a schematic diagram of a procedure according to exemplary embodiments of the present invention.

FIG. 3 illustrates an exemplary method according to the features of claim 1.

In particular, the drone (the aircraft) vertically climbs up to a maximum altitude at a constant speed. When doing so, a measuring device (e.g. a thermometer) captures the outside temperature at specific altitudes (step S1).

Capturing an outside temperature means that, at a specific altitude, a measured value of the outside temperature is captured and recorded in a manner assigned to the specific altitude.

Capturing an outside temperature may e.g. also mean that a measured value of the outside temperature is captured in an interval that starts before the specific altitude is reached and ends after the specific altitude is reached. The measured value thus captured in an interval can then be recorded as value assigned to the specific altitude.

Alternatively, however, capturing an outside temperature may also mean that a measured value of the outside temperature is taken in an interval starting before the specific altitude is reached and ending when the specific altitude is reached, or is captured in an interval starting when the specific altitude is reached and ending after the specific altitude has been reached. The measured value thus captured in an interval can then be recorded as value assigned to the specific altitude.

Subsequently, the drone (the aircraft) vertically descends at constant speed down to a starting point while flying through the same altitudes again (at the same speed). When doing so, the measuring device (e.g. a thermometer) again captures the outside temperature at the specific altitudes (step S2).

If, as has been shown above, the measured values are captured in an interval, this interval may be adapted depending on the direction e.g. so as to compensate any errors additionally occurring due to such measurement intervals.

By averaging the measured values of the same altitude or from a window around the altitude (i.e. measured values of different altitudes measured around the altitude) of the data from the ascent and the descent, the first-type thermometer error can be eliminated or lessened, so that the quality of the temperature measurements can be considerably improved (step S3).

According to this embodiment, the speed when climbing (i.e. when approaching the locations in the first direction or upward direction) does not compulsorily have to be constant. However, the respective speed on the way back (i.e. when approaching the locations in the second direction or downward direction) is equal at the respectively same altitude with negative signs (thus, the absolute approach speed for the two directions is substantially equal to a respective altitude).

In particular, the aircraft can apply an adaptive flying speed, so that e.g. slower flying takes place when high temperature differences are captured, which improves the accuracy of the measuring.

What is claimed is:

1. A method for determining a physical quantity at a plurality of locations, comprising:
    approaching the plurality of locations in a first predetermined direction, wherein at each location of the plurality of locations a first measured value of the physical quantity is measured,
    approaching the plurality of locations in a second predetermined direction substantially opposite to the first predetermined direction, wherein at each location of the plurality of locations a second measured value of the physical quantity is measured, and
    establishing a determination value for the physical quantity at a respective location of the plurality of locations, based on the first and second measured values of the physical quantity which have been measured at the respective location, wherein
    an absolute approaching speed for the first predetermined direction and the second predetermined direction at a respective location of the plurality of locations is substantially equal.

2. The method according to claim 1, wherein
    each location of the plurality of locations is defined by an altitude over a reference point,
    the first predetermined direction is substantially directed upwards, and
    the second predetermined direction is substantially directed downwards.

3. The method according to claim 2, wherein
    the reference point is one of a mean sea level and an approach starting point.

4. The method according to claim 1, wherein
    the determination value for the physical quantity at a respective location of the plurality of locations is established based on the first and second measured values of the physical quantity which have been measured at a predetermined number of approached locations around the respective location.

5. The method according to claim 1, wherein
said establishing the determination value for the physical quantity at the respective location of the plurality of locations comprises a formation of an average from the first and second measured values of the physical quantity which have been measured at the respective location.

6. The method according to claim 1, further comprising
adapting an approaching speed based on an extent of change of the physical quantity between adjacent locations, wherein
the approaching speed is reduced when the extent of change is increased, and
the approaching speed is increased when the extent of change is reduced.

7. The method according to claim 1, wherein
the physical quantity is one of temperature, humidity, wind velocity, wind direction, radioactivity, particle density, dew point, ozone concentration or nitrogen oxide concentration.

8. The method according to claim 1, wherein
each location of the plurality of locations is defined by global coordinates.

9. A device for determining a physical quantity at a plurality of locations, comprising
a measuring device,
a movement device, and
a control device, wherein
the movement device and the control device are configured to approach the plurality of locations in a first predetermined direction, wherein the measuring device is configured to measure a first measured value of the physical quantity at each location of the plurality of locations,
the movement device and the control device are further configured to approach the plurality of locations in a second predetermined direction substantially opposite to the first predetermined direction, wherein the measuring device is further configured to measure a second measured value of the physical quantity at each location of the plurality of locations, and
wherein the control device is further configured to establish a determination value for the physical quantity at a respective location of the plurality of locations based on the first and second measured values of the physical quantity which have been measured at the respective location, wherein
an absolute approaching speed for the first predetermined direction and the second predetermined direction at a respective location of the plurality of locations is substantially equal.

* * * * *